(12) United States Patent
Tang

(10) Patent No.: US 6,185,682 B1
(45) Date of Patent: Feb. 6, 2001

(54) AUTHENTICATION SYSTEM

(75) Inventor: Wei J. Tang, Taipei (TW)

(73) Assignee: U.S. Philips Corporation, New York, NY (US)

( * ) Notice: Under 35 U.S.C. 154(b), the term of this patent shall be extended for 0 days.

(21) Appl. No.: 09/090,101

(22) Filed: Jun. 3, 1998

(30) Foreign Application Priority Data

Jun. 3, 1997 (EP) ................................................ 97201667

(51) Int. Cl.$^7$ .................................. H04L 9/14; H04L 9/32
(52) U.S. Cl. ............................................. 713/168; 380/262
(58) Field of Search ............................... 713/168; 380/262

(56) References Cited

U.S. PATENT DOCUMENTS

| | | | |
|---|---|---|---|
| 4,310,720 | * | 1/1982 | Check, Jr. .......................... 178/22.08 |
| 4,908,861 | * | 3/1990 | Brachtl et al. ......................... 380/25 |
| 4,965,827 | * | 10/1990 | McDonald .............................. 380/25 |
| 5,325,434 | * | 6/1994 | Spaanderman et al. ................ 380/45 |
| 5,506,905 | * | 4/1996 | Markowski et al. .................... 380/25 |

FOREIGN PATENT DOCUMENTS

0737907A2   10/1996  (EP) .

OTHER PUBLICATIONS

Menezes et al, Handbook of applied cryptography, Oct. 17, 1996, sections 1.12, 9.5, 9.6.3, 9.77, 9.80.*

* cited by examiner

Primary Examiner—Gail O. Hayes
Assistant Examiner—Jeffrey Scott Leaning
(74) Attorney, Agent, or Firm—Daniel J. Piotrowski (57) ABSTRACT

An authentication system is disclosed that includes at least one station and a host. Each station having a memory for storing a plurality of authentication items. An authentication control element, such as a key, is constructed from a part of the authentication items which is selected for each message. An authenticator authenticates the message substantially under the control of the authentication control element constructed for the message. The authenticated message is sent to the host. The host having a memory for storing the authentication items of each station. The authentication control element is determined from the received authenticated message. A verifier is used for, under control of the authentication control element, verifying the authenticity of the received message.

10 Claims, 2 Drawing Sheets

AUTHENTICATION SYSTEM

BACKGROUND OF THE INVENTION

The invention relates to an authentication system comprising at least one station and a host; the station comprising: authentication means for, based upon an authentication algorithm, authenticating a message; and communication means for sending the authenticated message to the host; the host comprising: communication means for receiving an authenticated message; and verification means for verifying the authenticity of the received message by checking the received message with an authentication algorithm corresponding to a station which sent the message.

With the increase of electronic communication and electronic financial transactions, identification and authentication has become an essential aspect of many systems. Normally in an authenticated transaction three parties are involved: a host, a station and a user of the station. The host may, for example, be a central computer at a bank, at a retailer, or at a company providing services via Internet, or be a file server. The station may be a personal computer (PC), a Personal Digital Assistant (PDA) or a hand-held PC (HPC), usually connected or connectable via telecommunications to the host computer. The message may be a digital representation of a user generated message, including an instruction to a bank, but may also be computer data or computer code, such as a Java applet. In many applications, the station is split into two parts: a user station and an access station.

An identification, such as a communication address, which uniquely identifies the station is stored in the memory of the station. A message generated in the station, usually at the request of the user, is authenticated using an authentication algorithm. Typically, the message is authenticated by generating an additional digital signature. The authenticated message is sent to the host together with the identification of the station. The host uses the same or a complementary authentication algorithm to verify the authenticity of the message.

For certain applications, like a user instructing a bank to transfer money from a bank account, it may be required that the station performs some form of access control ensuring that only an authorised user can issue the instruction. The access control may, for instance, be based on a PIN-code or password. Also more advanced methods, for instance based on biometrical information, may be used. The access information may be passed on to the host as part of the message. For other applications, like a transfer of a small amount of electronic money, it may not be required or, in view of privacy or safety, even be undesired that additional access control is performed or that the access information is transferred to the host. The access control is not part of the invention.

It should be noted that the Dutch Giro (Postbank) uses the TAN (Transaction Number) system for electronic payments by customers using a PC and a modem. The customers of the Postbank receive via regular mail several transaction numbers printed on a piece of paper. For each transaction the client has to enter a next transaction number until all numbers have been used, at which moment the client receives a new set of numbers. A fraudulent party has, in general, easy access to the transaction numbers at the customer's premises. Furthermore, the distribution of the transaction numbers from the host to the customer makes the system vulnerable for fraudulent parties intercepting the list.

Most authentication algorithms are based on encryption algorithms, such as the symmetrical DES algorithm or the asymmetrical public-key RSA algorithm. Typically, the same algorithm is used for each station and a dedicated key is used to make the algorithm act in a manner specific for the station. The security provided by such algorithms is mainly based in the algorithmic strength of the involved algorithms, which are, as a consequence, complicated and costly to implement, which is a particular drawback for simple consumer electronic products.

SUMMARY OF THE INVENTION

It is an object of the invention to provide an authentication system of the kind set forth, which is simple to develop. It is a further object to provide such a system which can be cost-effectively implemented in consumer electronic products. It is a further object to provide such an authentication system which offers a high level of security.

To achieve this object, the authentication system according to the invention is characterised in that the station comprises a memory for electronically storing a plurality of authentication items; the host comprises a memory for electronically storing the authentication items of the station in association with an identification of the station;

the station comprises constructing means for constructing for each message a corresponding authentication control element; the constructing means being operable to select for the message a part of the plurality of authentication items and to construct the authentication control element from the selected part, where the authentication control element in practical circumstances causes the authentication algorithm to substantially authenticate the corresponding message uniquely; and the host comprises constructing means for constructing for each received authenticated message an authentication control element from the authentication items associated with a station which sent the message; the construction being the same as performed by the associated station.

The system according to the invention is based on the insight that the simple manner in which parents and children identify each other when they are not in direct contact, such as in the case of a kidnapping, can form the basis of an automatic authentication system. If for instance a child is kidnapped, the parents want to be sure that the kidnappers indeed hold the child and that, for instance, a ransom demand genuinely relates to their child. At the moment when identification of, for instance, the child is required, the child informs the kidnappers of a few events from a large set of events known to the child and parents and unknown to others (or at least to the kidnappers). For each communication with the kidnappers, the parents may request that the child recalls other events. This ensures that the kidnappers have to keep the child alive. It also ensures that no fraudulent kidnappers, who in one way or another intercepted a set of identifying events, can re-use this set for authenticating a fraudulent demand.

Based on this insight, the host (parent) and the station (child) share a large set of authentication items. For each message which needs to be authenticated, a small subset from the authentication items is selected and used to form an authentication control element which controls an authentication algorithm. In practical circumstances the authentication algorithm authenticates with a high likelihood the corresponding message uniquely under control of the authentication control element. A main strength of the system according to the invention lies in unpredictably authenticating messages by selecting a subset of authentication items from a relatively large set, where for each next message other items may be selected. This allows the use of a simple authentication algorithm, where the emphasis is not on the algorithmic strength of the algorithm, such as the difficulty of predicting for a message the corresponding authenticated message, but on using the algorithm in an unpredictable manner. A correlation which might occur in the authentications generated for successive messages can be broken by using an authentication control element, which is not related to the authentication algorithm. The authentication items, which determine the authentication control element can be generated in advance using sophisticated means, such as real random sequence generators, if desired. For a fraudulent party to be able to break the system, the fraudulent party needs not only to intercept sufficient messages to be able to break the authentication algorithm but also to determine the entire set of authentication items. The size of the set of authentication items and the size of the subset used to generate an authentication control element can be chosen to optimally suit the application in which the system is used. As an example, for a not very demanding application, a set of authentication items formed by a couple of hundred random bytes may be used, where the authentication algorithm may be based on a substitution, using a substitution table. Some or all elements of the substitution table which have been used during the substitution are replaced by new elements derived from the random bytes. These new elements form the authentication control element. The new elements may, for instance, be selected using a (pseudo-)random number generator. For more demanding applications, more authentication items may be used. If desired, also the complexity of the involved algorithm may be increased, for instance by basing the authentication algorithm on algorithmically strong encryption algorithm's such as DES, where the authentication control element forms a key for DES. For applications which require a high level of security, the authentication items and the algorithms are preferably stored in, respectively, executed in a secure module, such as a tamper-proof IC.

For simple systems, for instance used to check the authenticity of an entry ticket to a sporting event or concert, it may be sufficient to differentiate between authentic and non-authentic stations. The station, such as an electronic ticket, may be re-used for authenticating a series of events by using an event-specific message. For a more demanding system, such as involving financial transactions, a message is advantageously authenticated in a manner unique for the station.

BRIEF DESCRIPTION OF THE DRAWINGS

These and other aspects of the invention will be apparent from and elucidated with reference to the embodiments shown in the drawings.

DETAILED DESCRIPTION OF THE PREFERRED EMBODIMENTS

Figure 1:
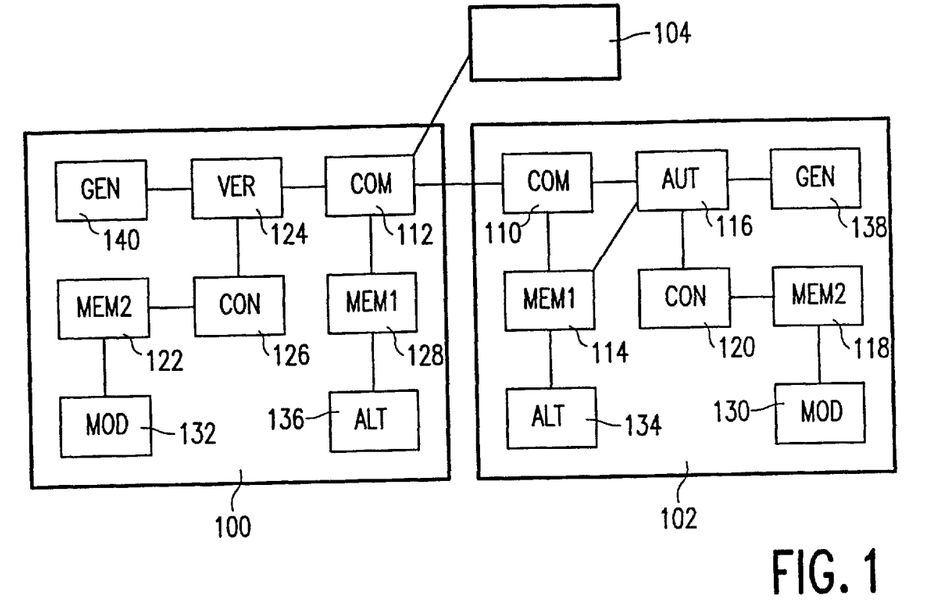
FIG. 1 shows a block diagram of a system according to the invention.

FIG. 1 shows a block diagram of a system according to the invention. The authentication system comprises a host 100 and at least one station. As an example two stations 102 and 104 are shown. Further details of the stations will be given with reference to station 102 only. Typically, the host 100 is implemented on a computer suitable for acting as a server. The station may be implemented on, for instance, a Personal Computer (PC), a Personal Digital Assistant (PDA) or a hand-held PC (HPC). In an exemplary application, a user instructs a bank to perform a financial transaction. The user enters the instruction in his station. The station generates a corresponding message, authenticates the message and transfers the message to the host computer at the bank. The host checks the authentication and, if valid, proceeds with processing the instruction. The authentication serves various well-known purposes, such as reducing the chance of a third party, pretending to be another party, transmitting a message on behalf of the other party (the third party may have generated the fraudulent message or may be a re-transmitting an intercepted message which has been validly transmitted by the original party) and reducing the chance of the original party repudiating the message. The system may also be used for various other forms of electronic communication, such as for authenticating electronic mail, the exchange of electronic documents (such as an HTML document) or program modules (such as Java applets), or the communication between software objects located in different computers. If the receiving party can trust the sending party, the authentication ensures that the receiving party can safely use the received digital data, without having any risk of, for instance, having received virus-infected data or data which may adversely effect the local station (e.g. by discarding locally stored data). Particularly in situations where stations do not share prior knowledge and wish to safely communicate, the communication preferably takes place via a trusted party. With respect to the sending station the trusted party acts like a host according to the invention and the sending station acts like a station according to the invention. With respect to the receiving station the trusted party acts like a station according to the invention and the receiving station acts like a host according to the invention. The trusted party relays a message received from a sending station to a receiving station if the trusted party has successfully verified the authenticity of the received message, using a verification procedure matching the authentication procedure of the sending station. The trusted party authenticates the received message, using a procedure agreed with the receiving station, before transmitting the message to the receiving station.

It will be understood that, particularly for mobile applications, the station 102 may be split into, for instance, a user station and an access station. The access station establishes the communication with the host 100 and may, for instance, be fixedly located in a shop, a petrol station or integrated with an automatic teller machine of a bank. The access station may also be located at the premises of the user and, for instance, be integrated with a personal computer or audio/video set-top box. The user station ensures a station-specific authentication. The user station may, for instance, be formed by a PDA communicating via IrDA to another PDA or personal computer acting as an access station. As another example, the user station may be formed by a smart-card, where the access station includes a smart-card reader.

The station 102 and the host computer 100 can communicate digitally. To this end, the station comprises communication means 110 for digitally communicating with the host 100. Similarly, the host 100 comprises communication means 112 for digital communication with the station. Usually, the communication will take place using telecommunication, either wired or wireless. The communication means 110 and 112 may be formed by a conventional modem, operated under control of the processor of the station or, respectively, the host. The communication may also be based on local communication, such as a Local Area Network (LAN), infra-red communication or local RF communication, such as for instance used in walkie-talkies. Conventional hardware/software, such as a LAN interface and driver software, may be used for implementing locally operating communication means 110 and 112.

Using the communication facilities, digital data can be exchanged between the station and the host. Typically, the exchange is bi-directional. In certain simple systems, it may be sufficient if communication is only possible from the station to the host. The station 102 comprises a memory 114 for electronically storing a station identification, which uniquely identifies the station to the host. The identification may take several forms. For instance the identification may be an identification at communication level, such as a communication address or a telephone number. The identification may also take the form of an account number, which may also be used in combination with a communication identification. For each communication session, the identification of the station 102 is transferred to the host 100, allowing the host 100 to correlate data exchanged during the session to the identified station 102. It will be appreciated that in certain circumstances, such as where the station is fixedly connected to the host, the identification may be implicit (e.g. which port the station is connected to).

The station 102 comprises authentication means 116 for authenticating a message. As described above, the message may, for instance, be a digital representation of a user generated message, including an instruction to a bank, but may also be computer data or computer code, such as a Java applet, or messages generated by computers (e.g. for playing a multi-user game on several computers). The authentication is based upon an authentication algorithm. In principle the authentication algorithm may be chosen to suit the security requirements of the application. Many techniques for authenticating a message are known. One way is to use a symmetrical encryption algorithm like DES, where the station and the host share the same private key. The station encrypts the message using the key and transmits the encrypted message to the host, along with the station identification. The host uses the station identification to retrieve the key corresponding to the station and uses this key to decrypt the message. Various schemes, such as encryption feedback, message counters or time-stamps, may be used to ensure that the same message is authenticated differently, eliminating the possibility of intercepting and re-transmitting the same message, which then would be accepted again as a valid message by the host. In situations where it is preferred that the entire message (or part of it) is readable, the message may be transmitted in addition to the encrypted message. In such a case, the host can also verify the authenticity of the received data by encrypting the received plain message and comparing it to the received encrypted message. To reduce the length of the data to be transmitted, the authentication part may also be smaller. It is well-known that this can be achieved by using a one-way hash function and encrypting the resulting hash value. The algorithm itself may simple and based on basic techniques, like confusion and diffusion. Using a confusion technique, such as substitution, the relationship between the plain text and the cipher text is obscured. For high security applications, it may be preferred to use a substitution scheme which operates on blocks of more than one letter. Using a diffusion technique, such as a transposition (also called permutation), the redundancy of the plain text is spread out over the cipher text. It is preferred that linear operations are used in combination with at least one non-linear operation. Whatever authentication algorithm is used, for the system according to the invention it is assumed that the algorithm is used under control of a so-called authentication control element. For an authentication algorithm using DES, this could be the private key. For an authentication algorithm based on substitution this may be (part of) a substitution table. For an authentication algorithm based on a permutation this may be (part of) a permutation matrix. In general, using a different authentication control element will with a high likelihood cause the authentication algorithm to authenticate a same message differently. For most algorithms it will hold that if the same authentication control element is used, the same messages will be authenticated in the same way. However, some authentication algorithms may have measures, such as an internal feedback, ensuring that this is not the case. For such algorithms, the authentication control element can, for instance, play the role of an initial seed, where the algorithm is (at least partly) reset each time a new authentication control element is provided, or the authentication control element may act as a supplementary control vector, which is, for instance, combined with the internal state variable or to the output of the algorithm. The combination may, for instance, take the form of an XOR operation or an operation in $GF(2^8)$ for byte-oriented algorithms. Depending on the algorithm, the authentication control element may be regarded as data or more as an operation.

According to the invention, the station 102 electronically stores a plurality of authentication items in a memory 118. It will be appreciated that the memories 114 and 118 may be combined. The station further comprises constructing means 120 for constructing the authentication control element. The construction means 120 derives the authentication control element from a small part of the entire set of authentication items. This may be done in various ways, like randomly selecting some items or some bits of some items and using the selected parts directly or after a mixing operation as the authentication control element. For each message a corresponding authentication control element is constructed. The authentication items are independent of the authentication algorithm, and as a consequence also the authentication control element is independent of the authentication algorithm. In this way any correlation which might occur when the authentication algorithm were to be used for authenticating a sequence of messages under control of the same authentication control element is broken by the unrelated authentication control element. It will be understood that the size of a small part with respect to the entire set of authentication items has to be determined in view of the requirements of the application in which the system is used and in view of further improvements as described below for further embodiments. In systems where the set of authentication items is highly static, a small part may correspond to a few percent or less of the entire set. In a system where the set is highly dynamic (i.e. regularly updated), a small part may be over 50% of the current set of authentication items, where the selected part is small compared to the superset of authentication items formed by the current authentication items and future changed authentication items. Such a higher percentage can particularly be used if the influence of an update of authentication items is spread over substantially all authentication items of an involved set of authentication items. Preferably, the authentication items have been generated randomly or selected randomly from a very large set of suitable authentication items. For instance, for a system used for financial transactions the authentication items may be generated in a secure manner using a high quality (real-)random sequence generator located at secure premises of a bank. The authentication items are loaded into the memory 118 of the station 102. The host 100 electronically stores a copy of the authentication items of the station in a memory 122. It will be appreciated that, depending on the authentication algorithm, the authentication item may be a data element, such as a bit or a byte, or an operation, such as a byte-wise XOR or a $GF(2^8)$ multiplication.

The authentication control element in practical circumstances causes the authentication algorithm with a high likelihood to authenticate the corresponding message uniquely. For high demanding systems, preferably each authentication control element is derived from at least one authentication item which has not been used before. Such a new authentication item may be combined with (e.g. mixed in with) authentication items which have been used before. In less demanding systems, a same selection of authentication items may be used a number of times for constructing an authentication control element, The construction means 120 should be such that even then the authentication control elements are different.

The host 100 comprises verification means 124 for verifying the authenticity of the received message. The verification means 124 checks the received message with an authentication algorithm which corresponds to the algorithm used by the station which send the message. The algorithm may be the same for all stations. If more than one algorithm is used, the host can locate the algorithm based on the received station identification. To this end, the station identification may be stored in a memory 128 of the host. It will be appreciated that the host may perform the verification by using the same authentication algorithm as used by the station to generate an authentication from the message and checks whether this matches the received authentication. For certain algorithms, the host may need to use an inverse algorithm of the algorithm used by the station. The host 100 comprises constructing means 126 for constructing for each received authenticated message an authentication control element from the authentication items for the identified station in a same manner as the station identified for the message.

In a further embodiment, the authentication algorithm authenticates each message in a manner unique for the station. This may be achieved by making the message authentication dependent on the station identification, which is unique for the station. Such a dependency may be obtained by deriving a key of the authentication algorithm or the authentication control element (partly) from the station identification.

Preferably, the authentication is made unique for the station by using authentication items which are unique for the station. The host 100 associates the copy of the authentication items of the station with the station, for instance, by combining the memories 122 and 128 and storing the station identification together with the authentication items. The construction means 126 of the host uses the received station identification to locate a matching station identification in memory 128 and via the matching identification locate the authentication items in memory 122 corresponding to the station. The station identification, which is used to distinguish the station amongst the other stations of the system with respect to the host, may, for instance, be a communication address or an account number. Consequently, a fraudulent party needs to intercept messages for each station in order to determine the authentication items specific for the station, making the task of the fraudulent party more complicated.

In a further embodiment, the station 102 comprises modification means 130 for modifying at least one of the authentication items after the authenticating means has authenticated a message. The host comprises modification means 132 for modifying at least one of the authentication items for the station in the same way as the modification means 130 of the station. Preferably, the station 102 effectuates the modification after the station has received a confirmation from the host 100 that the host has successfully received the message and verified the authentication of the message. It is preferred that any confirmation message is also authenticated in a manner similar to a message transferred from the station to the host. The modification means 132 performs the modification if the verification means 124 has successfully verified an authenticated message received from the station. Also, additional transaction and roll-back mechanisms as used for distributed databases may be used to ensure that the station 102 and the host 100 remain synchronised. The modification may take place in any suitable form. One way would be to combine a selection of other authentication items to one new authentication item and to replace an existing authentication item with the new item. Preferably, the modification means 130, 132 is operative to modify an authentication item at least partly based on an event independent of the authentication items. Advantageously, the modification is based on the content of one or more of the preceding messages. As an alternative or in combination, the modification may also be based on a time-stamp of one or more of the preceding messages. If a time-stamp is used, the time-stamp is also transferred to the host 100. The host 100 and the station 102 may also share an algorithm for generating or collecting the same random data elements, where information exchanged between the station 102 and the host 100 determines which of the random data elements is used for generating the new authentication item.

Thus, the set of shared information (the authentication item) is updated as the station and the host experience more shared events, like authenticating a message. In this way a fraudulent party not only has to determine the set of authentication items but also how the items are modified over time. Further, the modification means may be operative to modify an authentication item at least partly based on an event independent of the authentication items. In this way it becomes even more important for a fraudulent party to intercept and record all messages in order to be able to determine the authentication items. In a simple form the modification may be (partly) based on the previously authenticated message(s). This has the advantage that the message is already transferred to the host allowing the host to perform the same modification. In some systems the content of the message may be too predictable to significantly increase the task of a fraudulent party in breaking the authentication. In such systems more unpredictable events, such as the time at which the last message was authenticated, may be used. To allow the host to perform the same modification, the event has to be informed to the host, for instance, in the form of a time-stamp. Preferably, the modification is at least partly based a random or pseudo-random event. Advantageously, the least-significant bits of a clock are used, giving for most systems a sufficiently random event, particularly if messages are authenticated individually and not processed in a sequential batch.

In a further embodiment, the station 102 comprises alteration means 134 for altering the station identification after the authenticating means 116 has authenticated a message. The host 100 comprises alteration means 136 for altering the station identification for the station in the same way as the station after the verification means 124 has successfully verified a received authenticated message. Preferably, as described for generating the authentication control element, the altering is performed under control of a set of authentication items, which are independent of the altering algorithm. For instance, a selection of the authentication items may be 'mixed-in' with the station identification to obtain a new station identification. Preferably, a separate set of authentication items is used for generating the station identifications. Similarly as described for the modification means 130, the alteration means 134, 136 may alter the station identification at least partly based on a message and/or a time-stamp. This may, for instance, be achieved by modifying the set of authentication items used for generating the station identifications. The identification associated with the station may be a communication identification, such as a communication address or a telephone number, which is also used for the communication hardware/software to transfer messages between the desired devices. Preferably, the identification is a higher level identification, which is independent of the communication identification. An example of such a higher level identification is a bank account number. Both types of identification may also be used in combination. For such a combination, the communication identification may be kept the same whereas the higher level identification may be altered. If an identification, such as a virtual bank account number representing a real bank account number, is changed the underlying item (e.g. the real bank account number) is preferably kept the same, implying that in the host only the mapping of the representation (virtual number) to the actual underlying item is changed. Particularly, if the station interfaces to the user using the real underlying item, also the mapping in the station is updated. In some systems it may not be required that the station is aware of the real underlying item. It will be appreciated that a station (and as a consequence also the host) may have several different identifications, e.g. several bank account numbers, associated with the station, where each identification corresponds to its own unique set of authentication items. In order to exchange messages with several hosts, preferably the station has several identifications (at least one for each host) with corresponding set of authentication items.

Thus, it becomes more difficult for a fraudulent party to collect messages relating to the same station. Preferably, the host locates information, such as the authentication items, used for verifying the authentication at least partially based on the variable part of the identification. As note above, the host may locate the relevant information for verifying a message in dependence on a bank account number. Instead of using the real bank account number as the identification (and exchanging the real bank account number), a virtual bank account number is used. The station and the host are initially loaded with the same virtual account number. The host also knows how to associate (map) the virtual number with the real bank account number. Usually, the station also knows the real bank account number for local operations, such as display to the user, and preferably hides the virtual number from the user. The virtual number is exchanged and not the real number. Only in exceptional cases, e.g. when the synchronisation in updating the virtual number is lost between the host and the station, it may be required to re-synchronise to a new virtual number using the real number for once as an identification. Both the station and the host can alter the virtual number in the same way, keeping the real underlying bank account number fixed (i.e. only the mapping between a variable virtual number and a fixed real number is changed). In such a scenario, the virtual number acts as the identification according to the invention. Particularly, for mobile stations, such as a PDA or a smartcard, with no fixed communication link to the host, it becomes practically impossible for a fraudulent party to collect messages related to a specific station or a specific application within the station, such as an application for financial transfers/information retrieval, downloading of software or playing of a network game, where each application uses an application-specific authentication algorithm or set of authentication items. This allows the use of less authentication items or a simpler authentication algorithm. It further allows to detect fraudulent messages in an early stage. As an example, in a system where no more than 65,000 stations need to distinguished (implying that in principle a two-byte identification would be sufficient) a larger identification of, for instance, four of six bytes may be used, where the identification is chosen dynamically. If a four-byte identification is used, the host can identify almost all received fraudulent messages as being fraudulent simply by checking the identification. Only for in average 1 out of 65,000 fraudulent messages the authentication of the message (which typically involves more processing) needs to be checked. This makes the system suitable for use in environments, such as Internet, where brute-force attacks by generating many different fraudulent messages may occur. Preferably, the response time of the host is similar regardless of the station identification being valid or not, ensuring that fraudulent parties can not distinguish between valid and invalid station identifications. Advantageously, the alteration means alters the station identification at least partly based on a message and/or a time-stamp. In this way it becomes even more important for a fraudulent party to intercept and record all messages in order to be able to determine the current station identification.

In a further embodiment, the station 102 comprises data generation means 138 for generating additional data. The authentication means 116 is operative to authenticate a message in dependence on the additional data. The generated additional data is such that in practical circumstances with a high likelihood the additional data is different for each message. The additional data may be used in various ways. One way is to use the additional data in a manner 'invisible' to the outside world, except to the host 100. This can, for instance, be achieved, by first concatenating the original message and the additional data. Next, the authentication of the message with the additional data is determined, followed by removing the additional data before transferring the authenticated message (i.e. the original message plus the authentication for both the original message and the additional data) to the host 100. In this scenario, the host 100 also comprises data generation means 140 for generating additional data for a received authenticated message in a same manner as the identified station. The verification means 124 is operative to verify the authenticity of the received authenticated message in dependence on the additional data. The verification may be done similar to the authentication by first adding the additional data before checking the authentication. If the use of additional data is optional, it is preferred that the station 102 informs the host 100 whether the option is used for a message or not. This can be achieved by using an additional field, of for instance only one bit, in the message.

Thus, a simple manner is provided to ensure that messages, even the same messages, are with a high likelihood authenticated differently. Furthermore, it limits the possibilities of a fraudulent party, including the legitimate owner or designer of the station, to generate known messages and from the corresponding authenticated message derive the authentication items of the station. Moreover, the host may independently generate the same additional data, providing a further check of the authenticity of the message. Still further, by incorporating the additional data into the message, for instance by mixing the additional data with the message, and authenticating the resulting message, the host only needs to verify the resulting message as before and can then discard the additional data, without being able to generate the additional data. Advantageously, each station generates the additional data in a manner unique for the station.

As an alternative to using the 'invisible' additional data, the authentication means 116 may also incorporate the additional data into the message before authenticating the message. In this scenario the additional data is not removed from the message by the station 102. The additional data may be simply concatenated to or may be mixed in with the original message. The verification means 124 verifies the authentication of the entire message (original message plus the additional data). For the purpose of verification, the entire message can be regarded as the message. After the verification, the additional data is removed and the original message is passed on for further processing. The removal may be straightforward, particularly if the additional data is simply concatenated. For a more complex mix operation, the host 100 may need to perform a same mixing operation as the station in order to be able to determine at which positions in the message the data elements of the additional data are located or an inverse mixing operation to be able to remove the additional data from the message.

It will be appreciated that also a combination of using 'visible' and 'invisible' additional data can be advantageously used. In such a combination, for instance, the station 102 and the host 100 share some information A. The station 102 generates an additional part B and uses both parts A and B to generate additional data. The authentication is based on the entire additional data. The station 102 transfers in combination with the message the additional data as well as the additional part B to the host 100. The host 100 generates in the same way the additional data using the received part B and the part A, which was already stored in the host 100. The host 100 checks whether the generated additional data matches the received additional data. If so, the authenticity of the data is checked further. Particularly if the additional data and the parts A and B are relatively small compared to the message, this provides an effective filter for the host 100 for fraudulent messages without requiring a full verification of the entire message.

In a further embodiment, the construction means 120 and 126 comprise at least one state variable which influences the construction of the authentication control element. The construction means 120 and 126 update the state variable at least each time a message has been authenticated. The use of a state variable allows the construction means to autonomously select different parts of the authentication items for a large sequence of messages. The construction means may, for instance, be based on a (pseudo-)random sequence generator, where the state variable corresponds to a feedback state of the generator. Preferably, any periodicity in the sequence is sufficiently large in view of the application. For instance, the periodicity is larger than the expected number of messages authenticated by the station 102. The state variable may also be a pointer to an authentication item (in the set of authentication items), which has been last used for generating the authentication control element. If more than one authentication items is used for constructing the authentication control element, a separate state variable may be used for all of them. The construction means 120 and 126 construct the authentication control element under control of a control vector. The control vector may directly influence the operation of the construction means 120, 126, or, alternatively, may influence the output of the construction means 120,126 in a different manner, for instance by XOR-ing the control vector over the basic output (e.g. random number) of the construction means 120,126. The control vector is derived from a selection of the authentication items, for instance by 'randomly' selecting an authentication item from a given set of authentication items and using the selected item as the control vector. Preferably a separate set of authentication items are used for forming the control vector. Like described earlier, these authentication items may also be modified.

Thus, by using a state variable, such as a feedback state for a random number generator, the construction means can autonomously select different parts of the authentication items for a large sequence of messages. Preferably any periodicity in the selection is sufficiently large in view of the application. By ensuring that the selection also depends on the authentication items (for instance on a subset of the authentication items), which have been generated independent of the construction means, a correlation which might occur in successive selections can be reduced.

Figure 2:
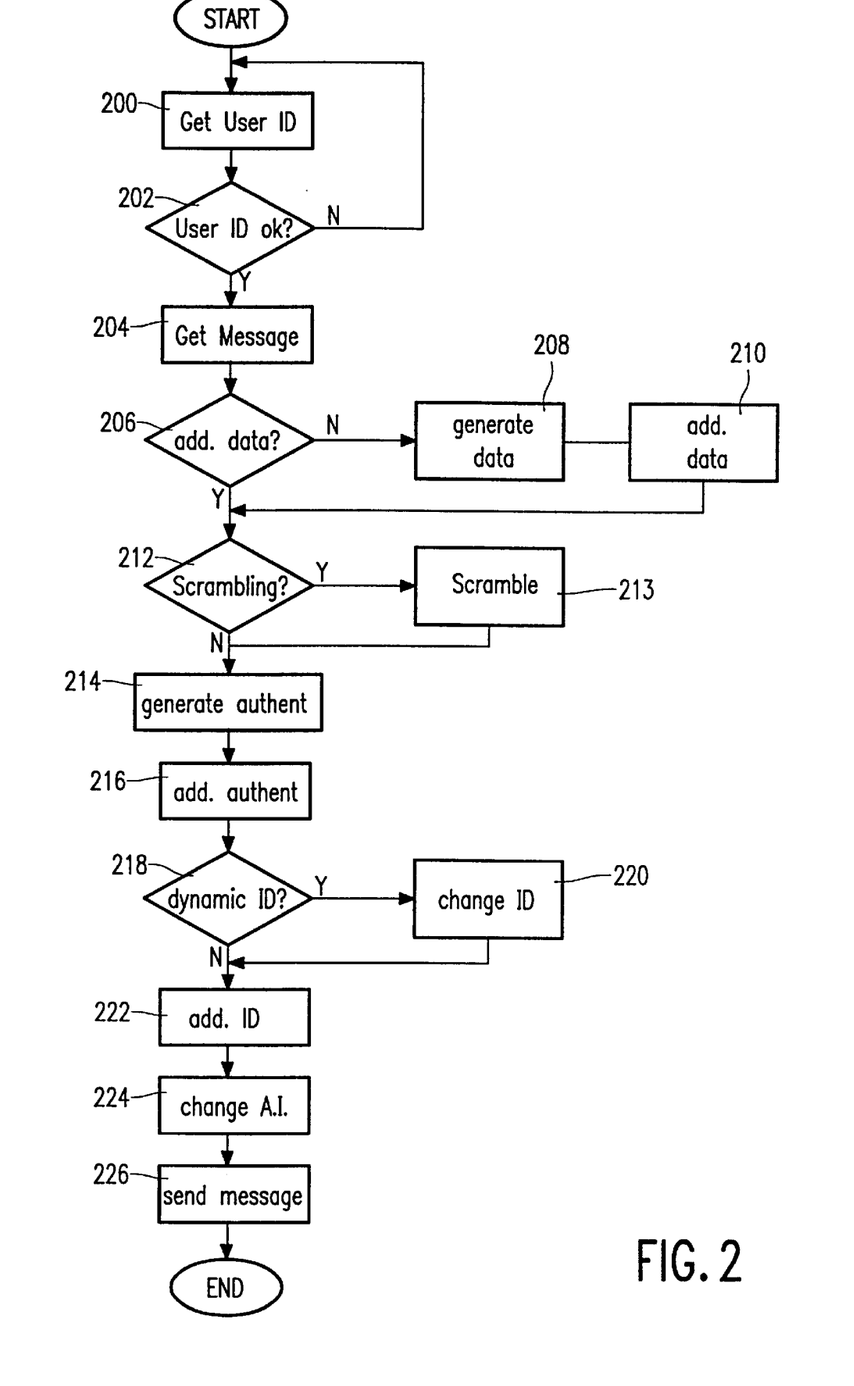
FIG. 2 shows a flow-chart of a possible operation in the station 102.

FIG. 2 shows a flow-chart of a possible operation in the station 102. In step 200, the station collects information regarding the identification of the user of the station, such as a user name and password, or a fingerprint. In step 202 the identification is checked. If not accepted, the previous steps are repeated one or more times, if required with a time delay and a limit on the number of retries. (Preferably, the station 102 reports a failed attempt when the legitimate owner successfully gains access). If accepted, in step 204 information is collected from the user based on which a message is compiled. Next in step 206 it is checked whether additional data is required. If so, in step 208 the additional data is generated and added (for instance appended) in step 210 to the message. In step 212 it is checked whether the message needs to be scrambled. If so, the scrambling occurs in step 213. The scrambling may be restricted to the original message generated at step 204 or may cover the entire message created at step 210. In step 214 the authentication for the message is generated and added to the message (e.g. appended) in step 216. In step 218 it is checked whether the option of dynamically changing the station identification is used. If so, in step 220 a new station identification is created. In both cases, in step 222 the station identification is added (e.g. prefixed) to the message. In step 224, one or more of the authentication items are changed. Preferably, authentication items which have been involved in any of the preceding steps are modified. Finally, in step 226 the message is sent to the host 100. Steps may be added to ensure that the host 100 and the station 102 stay synchronised (i.e. that authentication items and shared state variables are updated synchronously). In the exceptional case that the synchronisation in updating the virtual number used as the station identification is lost between the host and the station, it may be required to re-synchronise to a new virtual number by once using the real number as an identification. It will be appreciated that a similar corresponding flow-chart can be used to describe the activities of the host 100.

Figure 3:
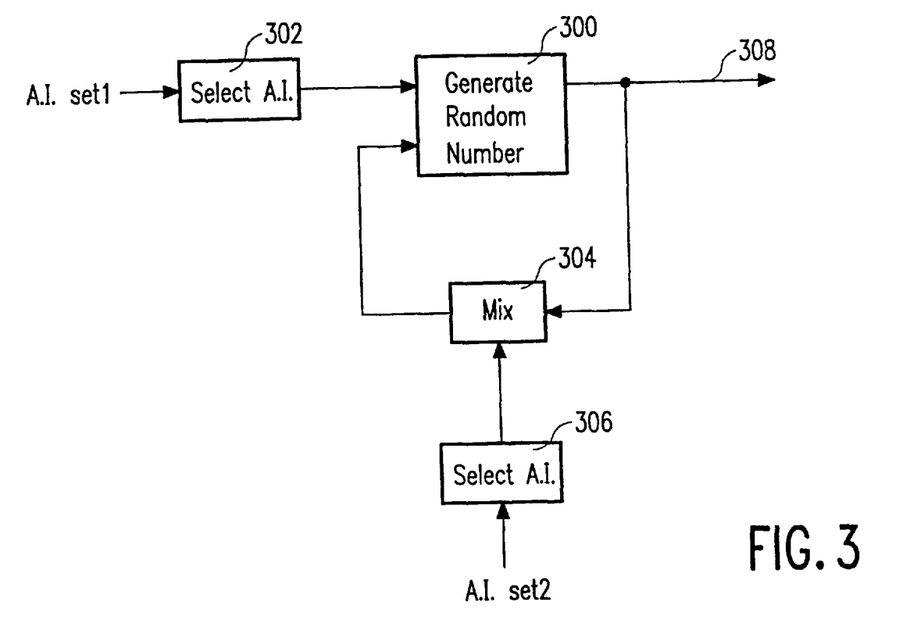
FIG. 3 shows a flow diagram of a basic operation which can be used in steps of FIG. 2.

FIG. 3 shows a flow diagram of a basic operation which can be used in various steps of FIG. 2. The core operation is performed in block 300, where a (pseudo-)random number is generated. In block 302 a seed for the generator is selected from a first set of authentication items. A correlation which might occur in the sequence of generated numbers is broken by using a feedback and combining in block 304 the feedback with at least one authentication item. The combination may simply be an XOR operation. The authentication item is selected in block 306 from a second set of authentication items. It will be appreciated that the combination may also be in the output path 308 of the generator 304 instead of in the feedback path. The sets of authentication items may, for instance, consist of 100 authentication items each. The actual number is preferably chosen to optimally suit the need of the application. The selection performed in blocks 302 and 306 may be straightforward, like each time selecting a next one of the authentication items. Using such a scheme, preferably the first authentication items have been changed, by the time all authentication items have been used. The basic operation of FIG. 3 may be used directly to generate the additional data of step 208 or the new station identification of step 220 in FIG. 2. For the scrambling of step 214, the random numbers can be used as entries in a substitution matrix. For instance, assuming that the data elements of a message are bytes, a substitution table may be used with 256 entries each with a byte value, where each byte value specifies a substitution value for a data element with a value matching the entry number in the table. Alternatively, the substitution byte may be selected based on the position of the byte in the original message, if desired, in combination with the value of the byte in the original message. As an example, a pointer which (logically) points to an element in the substitution matrix is loaded with an initial offset. This offset may be selected using the basic operation of FIG. 3. The value of the first byte of the message is combined with the pointer value (e.g. added to it). The value of the element in the substitution matrix to which the pointer points at that moment is chosen as the substitution value. For the next byte of the message, similarly the value of the next byte of the message is combined with the then valid pointer value, etc. The pointer may be one-dimensional, where the substitution matrix is logically arranged as a sequence where each row follows the previous row to form a Iona row (alternatively the columns may be logically concatenated). Such arrangement usually matches the physical arrangement for storing a matrix in a memory. Using a suitable modulo operation the pointer can be kept within the desired range of, in the example, 256 matrix elements. It will be appreciated that instead of a one dimensional pointer also a separate row and column index may be used. Instead of using the pointer or index value directly for selecting the substitution element, the value may also be fed through a randomiser, such as a random sequence generator, whose output is used as a pointer into the substitution table. In these examples it is assumed that the output of the generation 300 is a byte value. If not, a conversion may be required. The random numbers may also be used to create a permutation matrix for permuting the positions of data elements in the message. The basic operation can also be used for changing an authentication item in step 224. Since the changing, preferably, also depends on an external event, additional information, such as a message, and/or a time-stamp and/or a message counter, is fed into the random number generator 300. The output of the generator 300 may directly replace a constituent element (e.g. a value) of an authentication item.

For generating the authentication in step 214 of FIG. 2, a similar routine as described for the substitution may be used. In such a routine, in one round one data element (one signature element) is selected from a matrix (or long row) with data elements. Preferably, the initial data elements of the matrix have been generated randomly, where the data elements are refreshed by using the output of basic operation of FIG. 3 as a new data element (preferably in combination with a historical influence, such as the content of a previous message or a time-stamp, as described before). Alternatively, the output of the basic operation may be used to randomly shuffle the data elements of the matrix. A pointer which (logically) points to an element in the matrix is loaded with an initial offset. This offset may be selected using the basic operation of FIG. 3, which is preferably used under control of different sets of authentication items as used for generating the elements of the matrix. The value of the first byte of the message is combined with the pointer value (e.g. added to it). Next, the value of the next byte of the message is combined with the then valid pointer value, etc. When all bytes of the message have been processed, the value of the element in the matrix to which the pointer points at that moment is chosen as the signature value. The security can be improved by repeating the routine to generate further signature values. Preferably, for each successive round of generating a signature value a different initial offset value is chosen. Alternatively, a subsequent rounds continues using the last obtained pointer value of the previous as the starting value for the new round.

It will be appreciated that, although the description focuses on the communication from the station 102 to the host 100, the same authentication items can also be used for communication from the host 100 to the station 102.

What is claimed is:

1. An authentication system comprising at least one station and a host;

each station including
   authentication means for, based upon an authentication algorithm, authenticating a message,
   communication means for sending the authenticated message to the host,
   a memory for storing a plurality of authentication items,
   a constructing means for constructing for each message a corresponding authentication control element, the constructing means being operable to select a part of the plurality of authentication items and to construct the authentication control element for the message, wherein the authentication algorithm uses the authentication control element to generate an authenticated message; and the host including
   communication means for receiving an authenticated message,
   a memory for storing the plurality of authentication items of each station,
   constructing means for constructing the authentication control element within each received authenticated message,
   verification means for verifying the authenticity of the received message by checking the authentication control element constructed from the received message with the stored plurality of authentication items corresponding to a station which sent the message.

2. The system as claimed in claim 1, wherein the station includes a further memory for storing an identification uniquely identifying the station with respect to the host; the authentication means is operative to authenticate the message in dependence on the identification; and the verification means is operative to verify the authenticity of the received message in dependence on an identification of the station which sent the message.

3. The system as claimed in claim 1, wherein the authentication items are unique to each station; each station comprises a further memory for storing an identification uniquely identifying the station with respect to the host; the communication means of the station being operative to send the identification to the host in association with an authenticated message; and the host comprises means for locating the authentication items of a station in dependence on an identification received in association with an authenticated message.

4. The system as claimed in claim 1, wherein the station comprises modification means for modifying at least one of the authentication items after the authenticating means has authenticated a message and in that the host comprises modification means for modifying at least one of the authentication items for the station in the same way as the station after the verification means has successfully verified an authenticated message received from the station.

5. The system as claimed in claim 4, wherein the modification means is operative to modify an authentication item at least partly based on an event independent of the authentication items.

6. The system as claimed in claim 2 wherein the station comprises alteration means for altering the identification associated with the station after the authenticating means has authenticated a message and in that the host comprises alteration means for altering the identification associated with the station in the same way as the station after the verification means has successfully verified a received authenticated message.

7. The system as claimed in claim 1, wherein the authentication means comprises data generation means for generating additional data and in that the authentication means is operative to authenticate a message in dependence on the additional data; the additional data being different for each message.

8. The system as claimed in claim 7, wherein the verification means comprises data generation means for generating additional data for a received authenticated message in a same manner as the identified station and in that the verification means is operative to verify the authenticity of the received authenticated message in dependence on the additional data.

9. The system as claimed in claim 7, wherein the authentication means is operative to incorporate the additional data into the message before authenticating the message; and in that the verification means is operative to remove the additional data from a received authenticated message after having successfully verified the authentication of the message.

10. The system as claimed in claim 1, wherein, the construction means comprises at least one state variable influencing the construction of the authentication control element;

the construction means is operative to update the state variable at least each time a message has been authenticated; and to construct the authentication control element under control of a control vector derived from a selection of the authentication items.

* * * * *